UNITED STATES PATENT OFFICE.

ROBERT E. SCHMIDT, OF ELBERFELD, GERMANY, ASSIGNOR TO FARBENFABRIKEN OF ELBERFELD CO., OF NEW YORK, N. Y., A CORPORATION OF NEW YORK.

GREEN ANTHRAQUINONE DYE.

No. 12,548. Specification of Reissued Letters Patent. Reissued Oct. 23, 1906.

Original No. 812,684, dated February 13, 1906. Application for reissue filed May 24, 1906. Serial No. 318,602.

*To all whom it may concern:*

Be it known that I, ROBERT E. SCHMIDT, doctor of philosophy, chemist, residing at Elberfeld, Germany, (assignor to the FARBENFABRIKEN OF ELBERFELD CO., of New York,) have invented a new and useful Improvement in Green Anthraquinone Dyestuffs; and I hereby declare the following to be a clear and exact description of my invention.

My invention relates to the manufacture of new dyestuffs, which are most probably disulfonic acids of the anthracene series, by causing sulfonating agents to act on 1-4-diaryldiamido-8-oxyanthraquinone sulfonic acids having probably the following general formula:

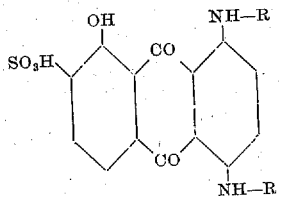

(R, meaning an aryl, such as phenyl, tolyl, xylyl, or the like.) By this process the sulfonation takes place in the nucleus of the aryl group.

The above-mentioned 1-4-diaryldiamido-8-oxyanthraquinone sulfonic acids can be obtained by condensing 1-4-8-trioxyanthraquinone sulfonic acid with primary aromatic amins. The 1-4-8-trioxyanthraquinone sulfonic acid is obtained by treating 1-4-8-trioxyanthraquinone with sulfonating agents and boric acid.

The new dyestuff sulfonic acids are in the shape of their alkaline salts green powders soluble in water with a green color and on heating in a solution of stannous chlorid in hydrochloric acid they are decomposed under the formation of a lecuo compound of the 1-4-8-trioxyanthraquinone sulfonic acid. They dye unmordanted and chrome mordanted wool green shades.

In carrying out my process practically I can proceed as follows, the parts being by weight: Twenty parts of 1-4-diparatolyldiamido-8-oxyanthraquinone sulfonic acid having probably the formula

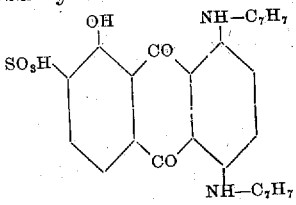

are stirred into eighty parts of fuming sulfuric acid, (ten to twenty per cent. of $SO_3$.) The mixture is stirred at from 30° to 50° centigrade until a test portion is easily soluble in cold water. The mass of the reaction is then mixed with three hundred parts of ice-water, and the new dyestuff sulfonic acid is precipitated in the shape of a dark-green powder by the addition of common salt, filtered off, and washed with a ten-per-cent. common-salt solution. The new product, which is most probably a disulfonic acid containing one sulfonic group in the anthraquinone nucleus and the other in the nucleus of the aryl group, is in the shape of its sodium salt a green powder soluble in water with a green color. The solution in concentrated sulfuric acid 66° Baumé is bluish green. If the dyestuff is heated in a solution of stannous chlorid in hydrochloric acid, it is decomposed under the formation of a leuco compound of the 1-4-8-trioxyanthraquinone sulfonic acid. It dyes wool pure yellowish-green shades.

The process proceeds in an analogous manner on starting from other 1-4-diaryldiamido-8-oxyanthraquinone sulfonic acids containing the sulfonic group in the anthraquinone nucleus, such as the 1-4-diphenyldiamido-8-oxyanthraquinone sulfonic acid or the like.

Having now described my invention and in what manner the same is to be performed, what I claim as new, and desire to secure by Letters Patent, is—

1. The herein-described new dyestuff sulfonic acids obtainable by sulfonating 1-4-diaryldiamido-8-oxyanthraquinone sulfonic acids containing the one sulfonic group probably in the anthraquinone nucleus and the other in the aryl nucleus, which dyestuffs are, in the shape of their alkaline salts, green powders easily soluble in water with a green color and on heating in a solution of stannous chlorid in hydrochloric acid they are decomposed under the formation of a leuco compound of the 1-4-8-trioxyanthraquinone sulfonic acid and dyeing wool green shades, substantially as described.

2. The herein-described new dyestuff sulfonic acid, obtainable by sulfonating 1-4-diparatolyldiamido-8-oxyanthraquinone sulfonic acid containing the one sulfonic group probably in the anthraquinone nucleus and the other in the benzol nucleus of the tolyl radical, which dyestuff is in the shape of its sodium salt a green powder soluble in water with a green color; being dissolved by concentrated sulfuric acid of 66° Baumé with a bluish-green color and on heating in a solution of stannous chlorid in hydrochloric acid it is decomposed under the formation of a leuco compound of the 1-4-8-trioxyanthraquinone sulfonic acid; and dyeing wool yellowish-green shades, substantially as described.

In testimony whereof I have signed my name in the presence of two subscribing witnesses.

ROBERT E. SCHMIDT.

Witnesses:

OTTO KÖNIG,

J. A. RITTERSHAUS.